Apr. 24, 1923.  
J. O. HEINZE  
LATHE TOOL  
Filed May 27, 1921
1,453,133
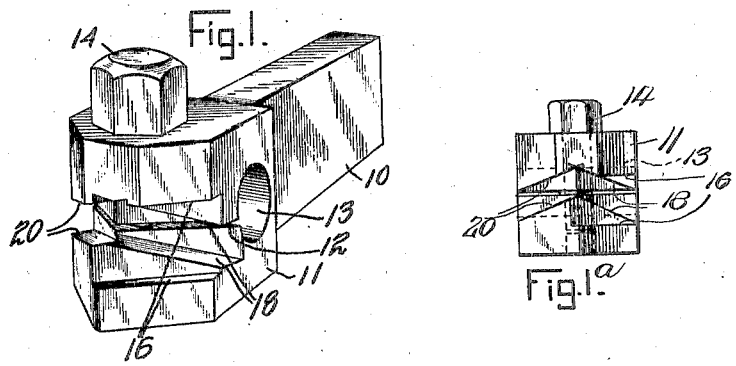
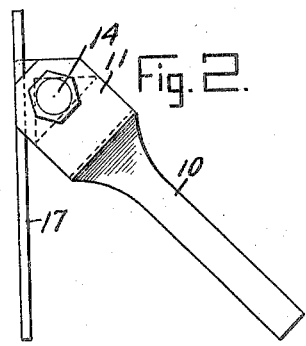
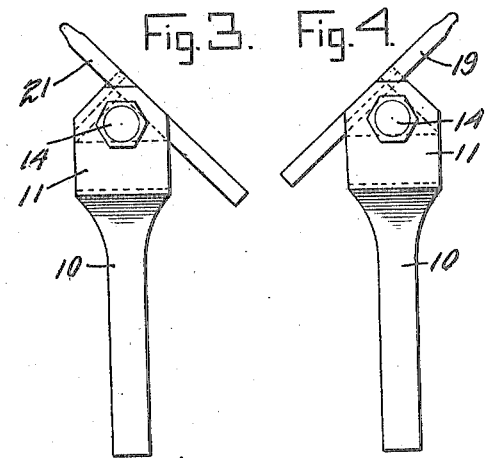
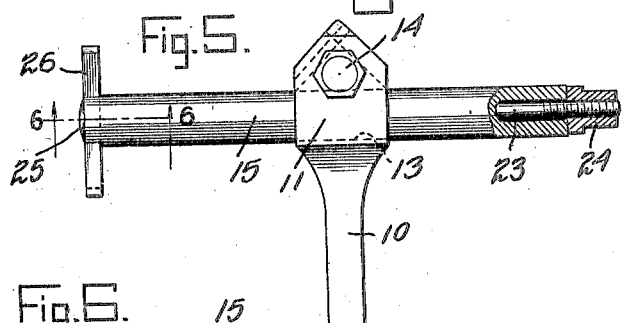
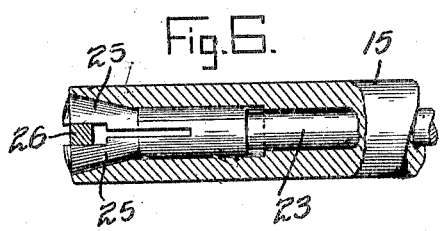
Inventor  
John O. Heinze.

Patented Apr. 24, 1923.

1,453,133

UNITED STATES PATENT OFFICE.

JOHN O. HEINZE, OF LAKELAND, FLORIDA.

LATHE TOOL.

Application filed May 27, 1921. Serial No. 473,128.

*To all whom it may concern:*

Be it known that I, JOHN O. HEINZE, a citizen of the United States, residing at Lakeland, in the county of Polk and State of Florida, have invented certain new and useful Improvements in Lathe Tools, of which the following is a specification.

My said invention relates to a lathe tool primarily intended for metal working machinery and it is an object thereof to provide a single holding device which shall be adapted to support in working position any one of the tools ordinarily used in a lathe of this character.

A further object of the invention is to provide in connection with a lathe tool a boring bar adapted to be held in operative position on the lathe tool and having improved means for holding a boring or other cutting tool.

Referring to the accompanying drawings which are made a part hereof and on which similar reference characters indicate similar parts, Figure 1 is a perspective of my lathe tool, Figure 1ª, a front elevation of the same, Figure 2, a plan view on a reduced scale showing a cutting-off tool held thereby, Figure 3 a view similar to Figure 2 showing a left-hand cutting tool in position thereon, Figure 4 a similar view showing a right-hand cutting tool in place, Figure 5 a plan showing the boring bar in working position on the lathe tool, and Figure 6 a detail of the tool-holding end of the boring bar, parts being broken away to show the inner structure.

In the drawings 10 indicates the shank of the lathe tool having a bifurcated head 11, the horizontal slot 12 terminating in a cylindrical opening 13 and being intersected by a clamping screw 14 for drawing together the two sides to clamp the various tools in place. A boring bar 15 (Figs. 5 and 6) is adapted to be inserted in the opening 13 and the outer extremity of the lathe tool is formed with a plurality of clamping faces for holding various cutters and the like, these faces being formed by cutting away portions of the head. Of these faces those indicated at 16 are intended for holding a cutting-off blade 17 (Fig. 2) or a facing tool or the like. The opposed faces 18, 18 are adapted to hold a right-hand cutting blade 19. A similar pair of faces 20, 20 at the opposite side of the head are adapted to hold a left-hand cutting tool 21.

A boring tool is shown in Figure 5 having a bar 15 set in the opening 13 of the lathe tool 10. A rod 23 passes through the holder and has at one end a screw for engagement by a nut 24 and at the other end is divided into two forks 25 to embrace a boring tool 26. It will be seen that the rod may be moved by rotation of the nut to lock or release the tool 25.

It will be evident that practically any tool of ordinary use in a lathe may be held in working position by the use of my device. For example an internal threading tool may be substituted for the boring tool 25, (Fig. 5) and any of the well known lathe tools used for shaping material may be substituted for the right and left-hand cutting blades of Figures 3 and 4.

It will also be evident to those skilled in the art that my device may be modified in various ways without departing from the spirit of the invention nor the scope of the appended claims. Therefore I do not limit myself to this specific device shown in the drawings and described in the specification but only as indicated in said claims.

Having thus fully described my said invention, what I claim as new and desire to secure by Letters Patent, is:

1. A lathe tool comprising a shank, a head thereon, said head being bifurcated, means for drawing together the sides of the head, the opposing faces of such sides being formed to engage directly with and to hold in place a cylindrical boring bar or cutting blades of various widths, substantially as set forth.

2. A lathe tool comprising a shank, a split head thereon, a transverse screw for drawing the sides of the head together, a cylindrical opening at one side of said screw to adapt it to receive a tool holder, and opposed faces at the other side of the screw formed by cutting away portions of the head, said faces being adapted to hold cutting blades, substantially as set forth.

3. A lathe tool comprising a shank, a split head, a transverse screw for drawing the sides of the head together, a cylindrical opening between the said sides, a hollow cylindrical bar fixed in said opening, a rod concentric with said bar and having one end formed to engage a tool, and a nut at the other end to impart longitudinal movement to the rod and so clamp the tool to the bar; substantially as set forth.

4. A lathe tool comprising a bifurcated head, means for drawing the sides of the head together and means on said head for directly engaging and holding alternatively a cylindrical boring bar, a cutting-off tool, a right-hand cutting tool and a left-hand cutting tool; substantially as set forth.

5. A lathe tool comprising a bifurcated head, means for drawing the sides of the head together and means on said head for directly engaging and holding alternatively a cylindrical boring bar, and cutting tools with rectangular holding portions; substantially as set forth.

6. In a tool holder, a shank having a bifurcated head, opposed sets of faces on the forks at the front end of the head adapted to engage tools of different sizes, different sets of clamping faces at one side of the head being differently inclined relatively to the body of the holder, and means for drawing the forks of the head together, substantially as set forth.

In witness whereof, I have hereunto set my hand and seal at Washington, District of Columbia, this 25th day of May, A. D. nineteen hundred and twenty-one.

JOHN O. HEINZE. [L.S.]

Witnesses:
FRANK W. DAHN,
O. M. KEYS.